C. N. WHIPPLE.
DRAG CHAIN LINK.
APPLICATION FILED SEPT. 8, 1919.
1,377,450.
Patented May 10, 1921.
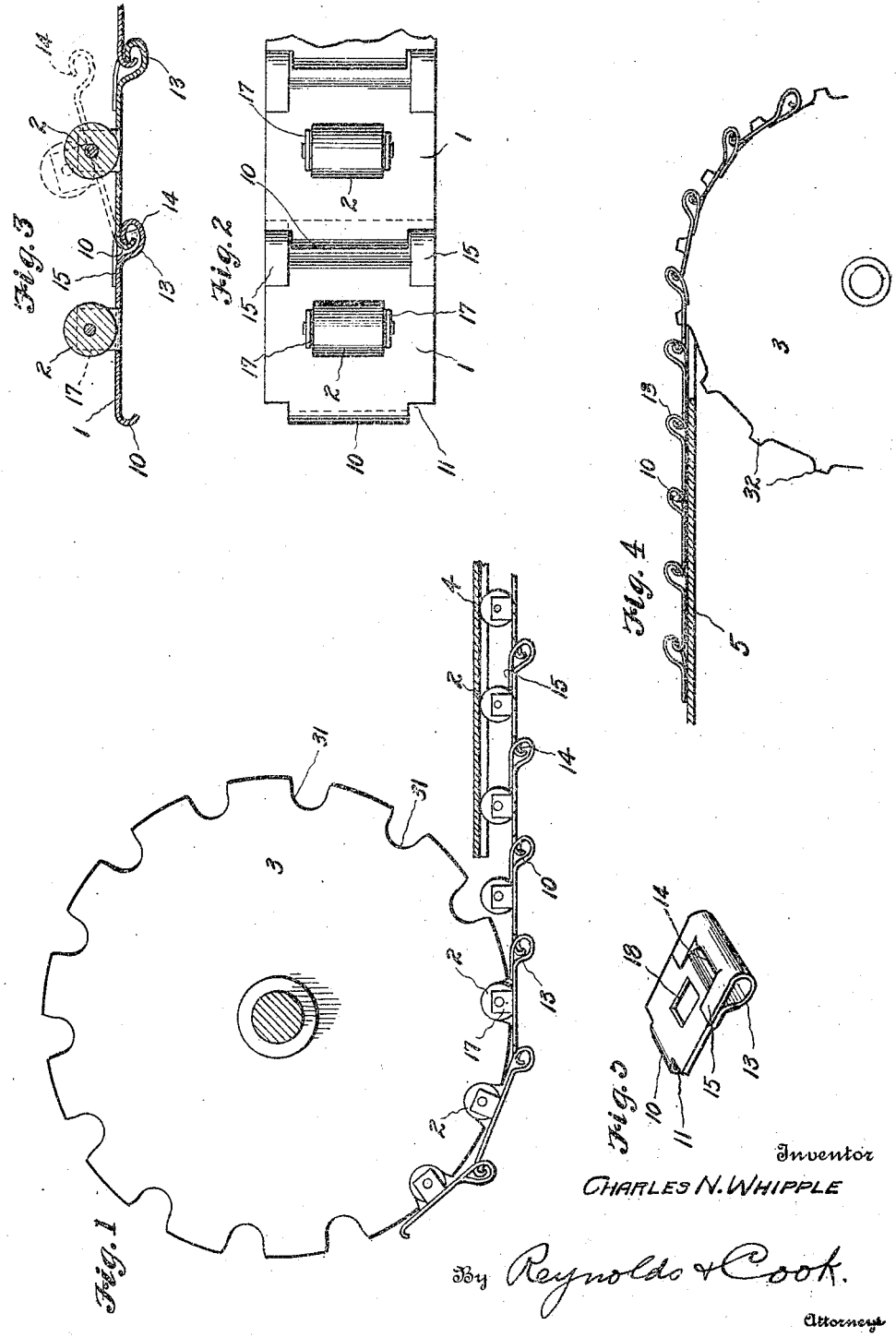
Inventor
CHARLES N. WHIPPLE
By Reynolds & Cook.
Attorneys

UNITED STATES PATENT OFFICE.

CHARLES N. WHIPPLE, OF BELLINGHAM, WASHINGTON.

DRAG-CHAIN LINK.

1,377,450.  Specification of Letters Patent.  Patented May 10, 1921.

Application filed September 8, 1919. Serial No. 322,475.

*To all whom it may concern:*

Be it known that I, CHARLES N. WHIPPLE, a citizen of the United States, and resident of Bellingham, in the county of Whatcom and State of Washington, have invented certain new and useful Improvements in Drag-Chain Links, of which the following is a specification.

My invention relates to an improvement in drag links, and in the chains formed therefrom.

The object of my invention is to provide a link which may be used to make up chains for various uses, by means of which the chain may be quickly made up, or taken apart, or a new link inserted.

Another object, and a more important object of my invention, is to provide a heavy duty chain link which may be cheaply and easily made, which will have a single-line bearing surface, forming in effect a knife-edge or rocker joint, thus eliminating excessive wear.

My invention comprises the novel parts and combinations of parts shown in the accompanying drawings, described in this specification, and defined by the claims terminating the same.

In the accompanying drawings I have illustrated my invention in its present preferred forms.

Figure 1 is an elevation of my improved chain and links, showing the chain used as a tractor tread.

Fig. 2 is a plan view of this form of link, the method of joining links being illustrated.

Fig. 3 is a section through two links, illustrating the knife-edge or rocker joint, the method of joining links being shown in dotted lines.

Fig. 4 is an elevation of a modified form of link and chain, illustrating it in use as a drag chain to be used for moving waste and saw dust in a lumber mill.

Fig. 5 is a perspective view of a link as shown in Fig. 4.

A chain made up of my links is capable of being put to many and varied uses. It is particularly adapted for operating under heavy loads, the peculiar formation of its rocker joint, which prevents excessive wear, peculiarly adapting it to such work. Herein but two uses are illustrated. Its use as a tractor tread chain is illustrated in Fig. 1, and its use as a drag chain for waste is shown in Fig. 4.

The link is preferably formed as a plate 1, the main body of which is flat. At one end is formed a downwardly bent hook 10, slightly less in width than the plate 1, forming shoulders 11. As herein shown, the hook 10 is formed from an integral tongue. The end of the hook 10 is preferably curled back slightly to form a secure but open hook.

At the other end of the plate 10 a second hook is formed. This hook is adapted to engage the hook 10 of the next link in the chain. As herein shown, and as I prefer to make it, this hook is formed integral with the plate 1. A section 13 of the plate is first bent downwardly, or in the same direction as the hook 10, and then upwardly to form a hook opening upwardly, or in the opposite direction to the hook 10. The hook proper, 14, is formed by curling the edge of the section 13 over until it faces toward the body of the plate 1. This should be depressed below the plane of the plate 1. Tongues 15 may extend from the section 13 to the body of the plate 1 or far enough to form guides for the hook 10 of the next link. Preferably they fit closely about this hook 10, and are of approximately the same width as the shoulders 11.

In some forms of the chain it may be found advisable to positively secure the tongues 15 to the body of the plate, as by spot-welding or riveting. It may also be found advisable at times to depress the plate 1 slightly to receive the tongues 15, thus providing a smooth, flush surface. This is particularly desirable when the chain is used as shown in Fig. 4.

Two adjacent links formed as described above engage only where the edge of the hook 14 engages the hook 10. The engagement is along a line, and is not a surface engagement. If desired, the edge of the hook 14 might be sharpened somewhat. This knife edge or rocker joint is below the plane of the plate.

Means for engaging a chain formed of such links and a sprocket wheel must be provided. As herein shown, each link is provided with sprocket-engaging means, though it is evident that this might be provided only on one link in two or three, or more links. In my preferred form, each link has a pair of ears 17 upstanding therefrom, in a direction opposite to the hooks 10 and 14. In these ears 17 a roller 2 is pivoted, its pivotal axis being transverse to the direction of movement of the chain. A sprocket wheel 3 has notches 31 which engage the rollers 2 to transmit power to the chain. In the form shown in Figs. 4 and 5, instead of employing a roller I cut a hole 18 in the plate, in which the teeth 32 of the sprocket wheel 3 engage. It is apparent that more than one roller 2 or hole 18 might be provided for engagement by sprocket wheels, this amounting only to duplication of parts.

When the chain is used as a tractor tread, the rollers 2 bear and roll upon the supporting surface 4 of the tractor. The section 13 forms the ground-gripping member. When used as a drag chain, for waste, sawdust, etc., the chain preferably lies flat and drags along over the support or chute 5. The section 13, in this case, forms the gripping or drag member.

I prefer always to pass the chain about the sprocket wheel so that the hooks 10 and 14 are away from, or outside, the wheel. However, there is nothing to prevent the chain being reversed if the radius of the sprocket wheel is reasonably large. If the radius is too short, the tongues 15 will act as stops for the shoulders 11, and will prevent the chain bending in this direction.

It will be seen that the chain may be quickly made up or taken apart by simply linking the hooks 10 with the hooks 14.

What I claim as my invention is:

1. A drag chain link comprising a plate formed with a central tongue at one end bent downwardly to form a hook, the other end of said plate being bent first downwardly and then upwardly to form a hook, the edge of said second hook being depressed below the upper level of the plate, and tongues at each end of the second hook extending laterally to the main plate.

2. A drag chain link comprising a plate formed with a central tongue at one end bent downwardly to form a hook, the other end of said plate being bent first downwardly and then upwardly to form a hook, the edge of said second hook being depressed below the upper level of the plate, and tongues at each end of the second hook extending laterally to the main plate and being secured thereto, portions of the main plate being depressed to receive the ends of the tongues, to form a plane upper surface.

3. A drag chain link comprising a plate having a downwardly bent hook at one end and a depressed upwardly bent hook at its other end, said hooks being less in width than the plate and of substantially equal width, and tongues at each end of the upwardly bent hook extending laterally to the main plate.

4. A drag chain link comprising a plate having a downwardly bent hook at one end, and a depressed hook at its other end bent upwardly and then forwardly to form an edge bearing below the level of the plate, and restraining tongues at each end of the upwardly bent hook extending laterally to the body of the plate.

5. A drag chain link comprising a plate having a downwardly bent hook at one end and a depressed, upwardly bent hook at its other end, said plate having ears pressed upwardly from the body thereof at transverse points and a roller revolubly supported between said ears adapted for engagement with a sprocket chain.

6. A drag chain comprising links formed as plates and each having a downwardly bent hook at one end and a second hook at its other end depressed below the plane of the plate and opening upward, the edge of said second hook being turned back toward the plate to form an edge bearing for the first hook of an adjacent link, and restraining tongues at each side of the second hook extending to the main plate, and forming guards embracing said first hook of the adjacent link.

Signed at Bellingham this 6th day of August, 1919.

CHARLES N. WHIPPLE.